US012435739B2

(12) United States Patent
Riva

(10) Patent No.: US 12,435,739 B2
(45) Date of Patent: Oct. 7, 2025

(54) OPEN CENTRE HYDRAULIC DISTRIBUTOR AND POWER TRANSMISSION SYSTEM FOR TRANSMITTING TO USERS OF AN OPERATING MACHINE

(71) Applicant: BUCHER HYDRAULICS S.p.A., Reggio Emilia (IT)

(72) Inventor: Massimo Riva, Modena (IT)

(73) Assignee: BUCHER HYDRAULICS S.p.A., Reggio Emilia (IT)

( * ) Notice: Subject to any disclaimer, the term of this patent is extended or adjusted under 35 U.S.C. 154(b) by 0 days.

(21) Appl. No.: 18/611,023

(22) Filed: Mar. 20, 2024

(65) Prior Publication Data

US 2024/0318670 A1 Sep. 26, 2024

(30) Foreign Application Priority Data

Mar. 22, 2023 (IT) ........................ 102023000005478

(51) Int. Cl.
*F15B 11/16* (2006.01)
*F15B 11/05* (2006.01)

(52) U.S. Cl.
CPC .......... *F15B 11/165* (2013.01); *F15B 11/055* (2013.01); *F15B 2211/20515* (2013.01); *F15B 2211/20538* (2013.01); *F15B 2211/20546* (2013.01); *F15B 2211/3055* (2013.01); *F15B 2211/3116* (2013.01);
(Continued)

(58) Field of Classification Search
CPC ........................ F15B 11/165; F15B 2211/3116
See application file for complete search history.

(56) References Cited

U.S. PATENT DOCUMENTS 5,277,027 A 1/1994 Aoyagi et al.
6,378,303 B1 * 4/2002 Higuchi ................ E02F 9/2239 60/468

(Continued)

FOREIGN PATENT DOCUMENTS

| | | | |
|---|---|---|---|
| CN | 103850286 | A | 6/2014 |
| EP | 1832685 | A1 | 9/2007 |
| GB | 2403029 | A | 12/2004 |

OTHER PUBLICATIONS

Italian Search Report for Italian Patent Application No. 202300005478 dated Sep. 15, 2023 (8 pages).

(Continued)

*Primary Examiner* — Michael Leslie
(74) *Attorney, Agent, or Firm* — Alston & Bird LLP

(57) ABSTRACT

Open centre hydraulic distributor, comprising: a free circulation line connecting a supply line from a negative control pump to a discharge; a delivery line connecting the supply line to users; at least one directional valve that intercepts the free circulation line and the delivery line, so that it narrows a transit area of the free circulation line and opens a transit area of the delivery line, and vice versa; a slide valve arranged on the free circulation line downstream of the directional valve; a valve device that is activated when a threshold value of a pressure delta between upstream and downstream of the directional valve is reached, and maintains this pressure delta equal to the threshold value; a negative control line to pick up a pressure signal from the free circulation line downstream of the directional valve and upstream of the slide valve.

10 Claims, 11 Drawing Sheets

(52) U.S. Cl.
CPC . *F15B 2211/40569* (2013.01); *F15B 2211/45* (2013.01); *F15B 2211/6652* (2013.01); *F15B 2211/71* (2013.01)

(56) References Cited

U.S. PATENT DOCUMENTS

| | | | | |
|---|---|---|---|---|
| 6,976,358 | B2 * | 12/2005 | Kim | F15B 11/167 60/452 |
| 9,153,605 | B2 * | 10/2015 | Kim | H01L 27/1259 |
| 9,399,856 | B2 * | 7/2016 | Fujishima | E02F 9/2296 |
| 10,280,592 | B2 * | 5/2019 | Takahashi | E02F 9/2235 |
| 10,563,377 | B2 * | 2/2020 | Kishida | E02F 9/2235 |
| 10,655,648 | B2 * | 5/2020 | Busani | F15B 11/055 |
| 11,566,640 | B2 * | 1/2023 | Nakajima | F15B 11/024 |
| 11,718,977 | B2 * | 8/2023 | Kumagai | E02F 9/2292 60/421 |
| 12,135,046 | B2 * | 11/2024 | Kang | F16K 31/1221 |
| 2009/0308068 | A1 * | 12/2009 | Yoshino | E02F 9/2296 60/468 |
| 2018/0372088 | A1 * | 12/2018 | Musiani | F15B 11/044 |

OTHER PUBLICATIONS

European Search Report for EP Patent Application No. 24162490 dated Jul. 12, 2024 (8 pages).

* cited by examiner

PRIOR ART

OPEN CENTRE HYDRAULIC DISTRIBUTOR AND POWER TRANSMISSION SYSTEM FOR TRANSMITTING TO USERS OF AN OPERATING MACHINE

This patent application claims priority to Italian Patent Application No. 102023000005478 filed on Mar. 22, 2024, which is incorporated herein by reference in its entirety.

The present invention relates to an open centre hydraulic distributor and a power transmission system for transmitting to users of an operating machine.

As is well known, a negative control system is a system that controls the flow rate dispensing of a hydraulic pump as a function of a driving signal (typically a driving pressure) generated by control devices suitable for generating such a signal. Typically, the devices for generating the negative driving signal act on the free circulation line of the distributor, downstream of the control sliders of the operating functions, for example of an earthmoving machine. In particular, the negative control takes place in such a way as to reduce the flow rate dispensed by the pump as a function of an increase in the negative driving signal and vice versa.

The present invention is applicable to variable displacement pumps, load-sensing pumps or fixed displacement electric pumps. The present invention finds particular utility in the field of electrification of the operating machines where there is a need to efficiently and smartly control a servo motor for the control of a hydraulic pump.

Open centre hydraulic distributors, combined with fixed displacement hydraulic pumps, are widely used in multiple application fields on small and medium-sized operating machines due to their dimensional compactness, economy, simplicity of construction and functional effectiveness. Typically in conventional operating machines equipped with an endothermic engine, a fixed displacement pump dispenses a constant flow rate solely as a function of the engine revolutions, not at all taking into account the real demand for flow rate by the actuated functions. The system thus configured de facto hides some intrinsically dissipative aspects linked to the absence of a direct control over the flow rate dispensed by the control valve and by the operating functions.

To cope with these dissipative aspects, historically, on large-sized machines (see for example 22-ton tracked excavators) the open centre system has evolved into what is called negative flow control in which the pump used is no longer with fixed but with variable displacement and a function of the actual flow rate demand of the controlled system.

In this context, a solution of a known type is illustrated in FIG. 1 and described below.

The pressure upstream of a control choke, located in the free circulation channel downstream of the directional valve, is used to control the regulation of the displacement of the pump and consequently the dispensing of flow rate to the distributor. When the valve is in the stand-by (rest) position, the pump is controlled so as to position itself at a minimum displacement, directing all the small controlled flow rate, through the open centre free circulation line and the control choke, directly into the tank.

By actuating a distribution section of the directional valve, in order to convey flow rate to the users, the free circulation line is gradually closed increasing the pressure of the pump. At the same time, the delivery line is gradually opened in accordance with a predetermined phasing of the transit gaps/areas. When the pressure of the load at the user is exceeded, a part of the flow rate is directed to the actuator.

This decreases the pressure upstream of the control choke by making the displacement of the pump increase. When the free circulation channel is completely closed, the pressure upstream of the choke is at the minimum value and the pump thus moves to the maximum displacement. This system is called negative flow rate control, as a decrease in the control pressure results in an increase in the displacement of the pump.

Consequently, the flow rate at the user for a given position of the slider of the directional valve is dependent on the load at the user itself, as in a typical open centre system. If the load increases, for a given position of the slider, the flow rate at the user tends to reduce itself causing an imbalance of the boundary conditions upstream of the control choke present at the end of the free circulation channel. The flow rate astride the choke increases with consequent increase in negative pressure. The system, in an attempt to correct these new operating conditions, will tend to reduce the flow rate dispensed by the pump until the new system equilibrium position is reached. Clearly, the operating principle remains the same even in the case of multiple actuations, with the only difference being that also the distribution of flow rate among the utilities is dependent on the relative loads. The benefit in terms of reduction of the system energy dissipations, thanks to the use of a variable pump configuration, has made these systems widely used on large power operating machines together with the well-known traditional or anti-saturation load-sensing circuits.

For example, EP2341193 A1 describes a control system of at least one variable displacement hydraulic pump of the negative type. The system provides for the use of a motor of various kind (electric, endothermic, . . . ), an open centre distributor with pressure signal generating devices, installed downstream of the distributor slides, for the control of a hydraulic pump (negative choke and maximum valve in parallel), a reducer fed by the pump-distributor connection line adapted for the generation of pressure for the hydraulic drives of the distributor slides and in particular a retainer downstream of the reducer and an accumulator downstream of the retainer.

Basically, it is an application variant of a standard negative system in which in order to avoid the presence of a service pump dedicated to the driving line of the distributor slides (additional component, costs and energy dissipation) or of a system pre-loading device capable of generating a pressure sufficient for the driving system at the expense of an increase in crossing pressure losses, a mechanical reducer is used combined with an accumulator and with a retainer that constitutes a more energy efficient and sufficiently economical solution.

Another example of a variant of a negative flow control system can be found in WO 2017/103079 A1. To the system base described above, a mechanical pressure reducer is added in the first place upstream of the free circulation notches (i.e. of the distributor slides), in order to control the pressure loss on the free circulation channel including the pressure drop on the negative choke. As is well known, the pressure drop on the negative choke determines the command signal for a negative control pump or, through the use of a driven accessory device, of a pump of the variable displacement load-sensing (LS) type. If the pressure upstream of the reducer exceeds its calibration, the reducer becomes operational and tries to maintain the pressure downstream of the same constant and equal to its calibration, except for its intrinsic characteristic.

Further variants arise from the need to command an LS pump by inserting a variable choking device driven by the negative pressure in appropriate command lines. The negative pressure is no longer used directly for the command of the pump but indirectly for the control of the choking device that generates an appropriate pressure drop for the management of the LS pressure range and the regulation of the displacement of the pump itself. The choke can be inserted at the inlet to the distributor or on the channel parallel to the users.

In recent years (last decade), the market for small-sized operating machines, due to increasingly stringent regulations in terms of environmental impact, has become particularly receptive and sensitive to the term "electrification" of the vehicle both for the traction and operating components.

Another variant of a negative control system can be found in GB 2549596 A which describes an electronically controlled system of a variable displacement hydraulic pump based on the architecture described above. This system comprises the use of two pressure sensors, acting one on the inlet to the distributor and the other downstream of the distributor slides and consequently upstream of the negative choke, and of an ECU capable of processing the input signals coming from the pressure sensors and of commanding the variation of the displacement of the variable pump. In particular, the inlet sensor is used for a control of consistency of the absorbed power with the power available to the engine in order to avoid the stalling condition of the engine through the commanded reduction of the displacement of the pump.

The main drawback of all prior art solutions in the field of the negative control is linked to the presence of the control choke. Due to the intrinsic characteristic thereof, as the flow rate on the free circulation channel increases, the pressure upstream of the control choke increases according to the quadratic law. This results in instability and imprecision in control that are not negligible.

In the electric vehicle sector, the systems currently on the market are based on the positive control concept, i.e. systems in which an increase in demand corresponds to an increase in flow rate to the utilities. Currently, the electrification trend of the operating machines mainly but not exclusively involves small-sized machines (contained powers) since they are typically multifunction machines for non-continuous use and can therefore be equipped with more traditional 48V or 96V batteries without having to incur in high-voltage systems that are much more expensive and subject to stringent safety regulations.

Since these machines are tendentially inexpensive, it is important that their costs are not too dissimilar from their variant with traditional motorisation and transmission.

For these reasons, the machines are typically equipped with fixed displacement pumps with external gears, typically of a low-noise type, and open centre distributors that control the flow rate of the electric pump that supplies the working hydraulics proportionally to the stroke of the sliders. The stroke of the sliders is monitored by using position sensors to be applied to the distributor sections and in multifunction machines which has a decisive impact on the final cost of the distributor itself. In addition, the installation of the sensors requires space and particular architectures of the command elements that might jeopardy the realization of a part of the options typically necessary for these machines and generate encumbrances that are not compatible with the installation spaces on the machine.

With a view to implementing negative control systems on these machines, the imprecision and control instability of the known solutions results in such an inefficiency that it is not possible to highlight a real advantage over the positive control systems. In fact, such electric machines must use the minimum possible amount of energy to avoid long loading times that jeopardize their efficient use, and therefore a particular control precision and low dissipation are required.

In this context, the technical task underlying the present invention is to propose an open centre hydraulic distributor and a power transmission system for transmitting to users of an operating machine, which overcome the drawbacks of the aforementioned prior art.

In particular, an object of the present invention is to propose an open centre hydraulic distributor and a power transmission system for transmitting to users of an operating machine, which allow a negative control of a supply pump to be realized, which is more precise and stable than the prior art.

Another object of the present invention is to make available an open centre hydraulic distributor and a power transmission system for transmitting to users of an operating machine, which allow a negative control to be realized for electric pumps.

Another object of the present invention is to propose an open centre hydraulic distributor and a power transmission system for transmitting to users of an operating machine, with reduced energy dissipation compared to the known solutions.

The stated technical task and the specified objects are substantially achieved by an open centre hydraulic distributor, comprising:

- a supply line for supplying a fluid that is receivable from a pump of the negative control type;
- a free circulation line that connects the supply line to at least one discharge;
- a delivery line that connects the supply line to one or more users downstream of the distributor;
- at least one directional valve so fitted as to intercept the free circulation line and the delivery line, said at least one directional valve comprising an actuator that is movable between at least a first and a second position and so configured that the movement from the first to the second position narrows a transit area of the free circulation line and opens a transit area of the delivery line;
- a slide valve arranged on the free circulation line downstream of said at least one directional valve;
- a valve device configured to be activated when on the free circulation line a threshold value is reached that is given by the difference between a pressure value upstream and a pressure value downstream of said at least one directional valve, and to maintain said pressure difference equal to the threshold value;
- a negative control line to pick up a pressure signal from the free circulation line in a position downstream of said at least one directional valve and upstream of the slide valve, said negative control line being intended to bring a pressure signal to the pump to perform the control of the negative type.

According to one aspect of the invention, the slide valve is configured to follow a linear opening/closing characteristic in an operating interval.

In accordance with a first embodiment, the valve device is arranged on the free circulation line.

In accordance with a second embodiment, the valve device is arranged on the supply line and is configurable in at least one first condition, in which it establishes an exclusive communication of the supply line with the free circulation line, and a second condition, in which it places the supply line in communication with the free circulation line and the delivery line.

Preferably, the valve device is configured in the first condition when the difference between a pressure value upstream and a pressure value downstream of said at least one directional valve is lower than said threshold value; when the threshold value is reached the valve device is configured in the second condition.

According to one aspect of the invention, the distributor comprises a bypass line that puts in communication a portion of free circulation line upstream of the slide valve with a portion of free circulation line downstream of the slide valve, and a choke arranged on the bypass line.

According to one aspect of the invention, the distributor comprises a diverting line that connects the supply line to the discharge. Preferably, the distributor comprises a maximum pressure valve arranged along said diverting line and configured to open when a set pressure value that is equal to a maximum system pressure value is reached.

In an alternative embodiment, the distributor comprises:

a branch connected on one side to the delivery line or alternatively to the supply line and on the other side to the free circulation line in an intermediate position between said at least one directional valve and the slide valve;

a pressure relief valve arranged on the branch and configured to open when a set pressure value is reached that is equal to a maximum system pressure value.

In an alternative embodiment, the distributor comprises:

a branch connected on one side to the delivery line or alternatively to the supply line and on the other side to the free circulation line in an intermediate position between said at least one directional valve and the slide valve;

a solenoid valve arranged on the branch and configured to open in response to a signal.

The stated technical task and the specified objects are substantially achieved by a power transmission system for transmitting to users of an operating machine, comprising: a distributor according to what has been described;

a pump of the negative control type, said pump being arranged upstream of the distributor, said distributor receiving a fluid from the pump by the supply line.

According to one aspect of the invention, the pump is a fixed displacement electric pump. The power transmission system comprises at least one pressure sensor 6 that is operationally active on the free circulation line to detect a pressure value upstream of the slide valve. The pressure sensor 6 is in communication with the electric pump.

Further characteristics and advantages of the present invention will become more apparent from the indicative and thus non-limiting description of a preferred but non-exclusive embodiment of an open centre hydraulic distributor and a power transmission system for transmitting to users of an operating machine, as illustrated in the attached drawings, in which.

Figure 1:
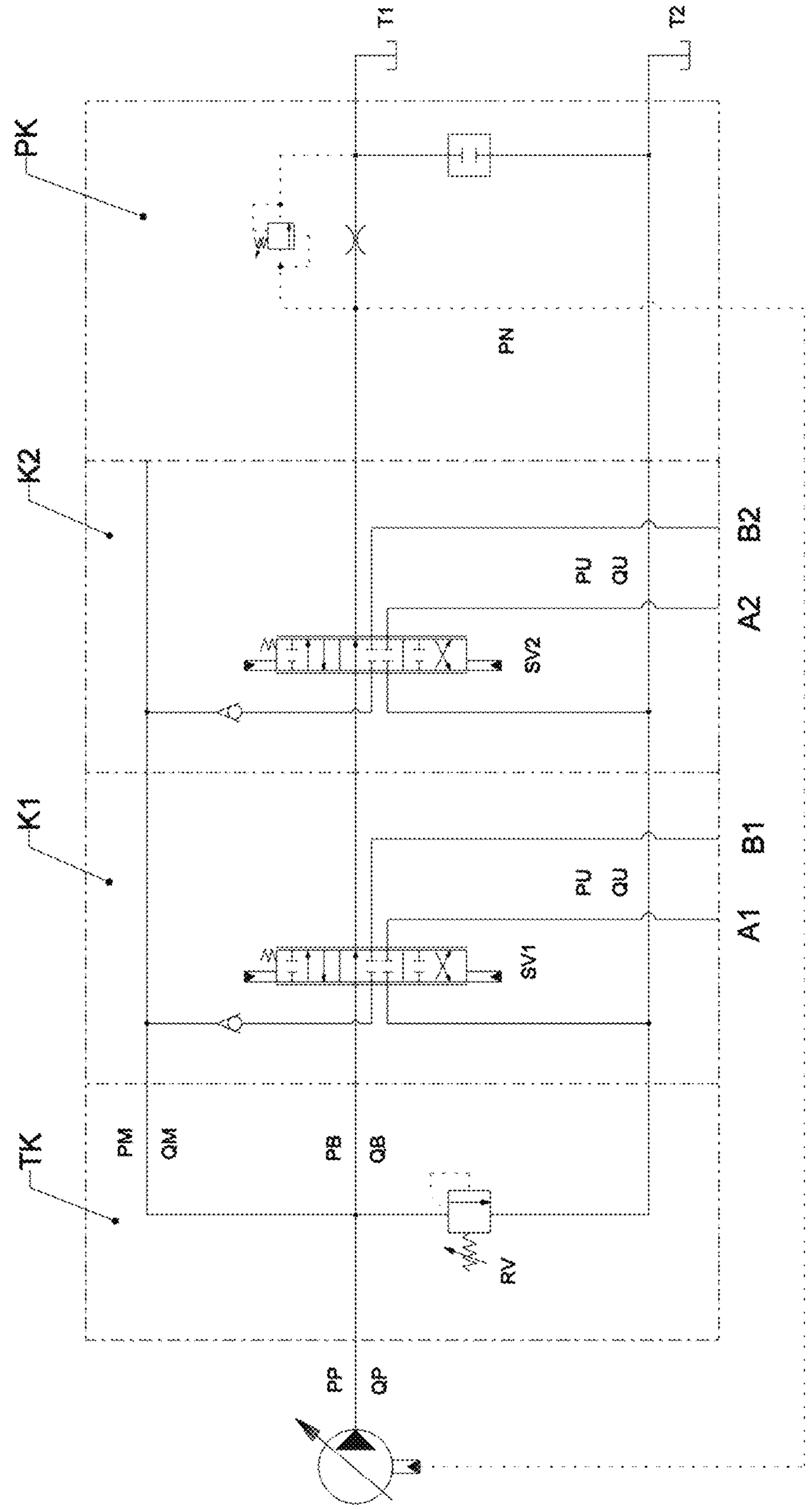
FIG. 1 illustrates a prior art solution for the control of a variable displacement pump of the negative type.
Figure 2:
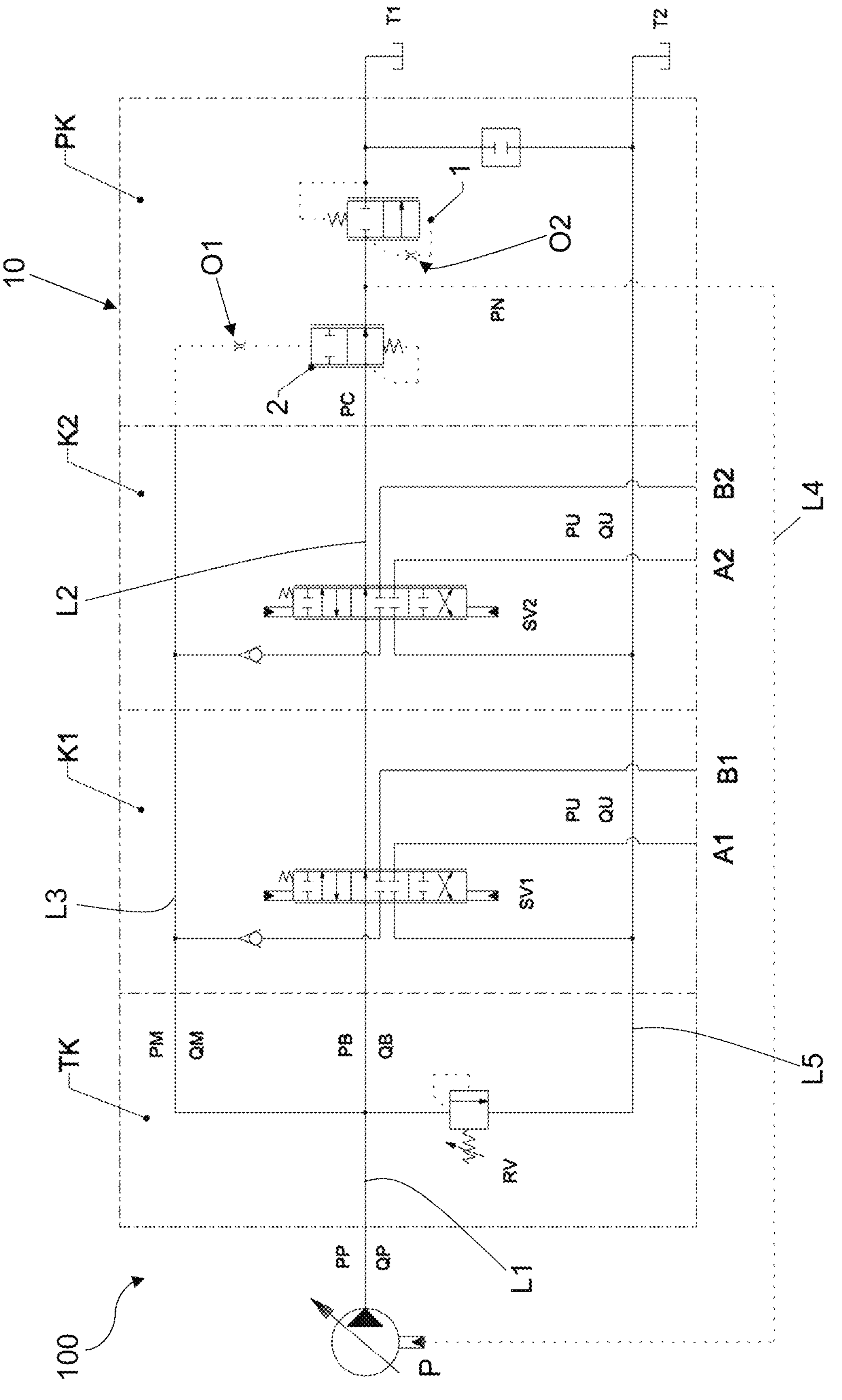
FIG. 2 illustrates an embodiment of a power transmission system for transmitting to users of an operating machine, with variable displacement pump, comprising a first embodiment of an open centre hydraulic distributor, according to the present invention, in schematic circuit view.

With reference to the figures, number 10 denotes an open centre hydraulic distributor of a fluid.

The distributor 10 comprises a supply line L1 for supplying the fluid that is receivable by a pump P of the negative control type.

The pump P can be a variable displacement pump or a fixed displacement electric pump or a load-sensing type pump.

As is well known, a negative control system is a system that controls the flow rate dispensing of a hydraulic pump as a function of a driving signal (typically a driving pressure) generated by control devices suitable for generating such a signal. Typically, the devices for generating the negative driving signal act on the free circulation line of the distributor, downstream of the control sliders of the operating functions, for example of an earthmoving machine. In particular, the control is defined as negative since it takes place in such a way as to reduce the flow rate dispensed by the pump as a function of an increase in the negative driving signal and vice versa.

The figures represent the distributor 10 applied to a variable displacement pump P. Nonetheless, the same concept can be applied to the control of a fixed displacement electric pump or a load-sensing type pump.

The distributor 10 is usually composed of an inlet head TK, at least one operating section K1 that manages the connection of the pump P and of a discharge (exemplarily represented in the figures as two elements T1, T2) with operating utilities A1, B1, A2, B2, and a closing cover PK. The operating section K1 is interposed between the inlet head TK and the closing cover PK. The discharge T1, T2 is a tank.

In the preferred embodiment, the operating sections are two and are indicated with K1 and K2.

The distributor 10 is illustrated in a non-exclusive way in its modular version. However, the present invention applies without extraordinary modifications also to a monobloc distributor 10.

The distributor 10 comprises a free circulation line L2 that connects the supply line L1 to the discharge T1, T2. The distributor 10 comprises a delivery line L3 that connects the supply line L1 to the operating utilities (or users) A1, B1, A2, B2.

The development of the supply line L1 in the free circulation line L2 and in the delivery line L3 takes place in the inlet head TK.

The operating sections K1, K2 are located downstream of the inlet head TK. The closing cover PK is located downstream of the last operating section K1, K2.

The distributor 10 comprises at least one directional valve SV1 (specifically, called "distributor slide") so fitted as to intercept the free circulation line L2 and the delivery line L3.

The directional valve SV1 is configured to manage in reverse manner the narrowing/widening of the transit area of these lines. In other words, when it narrows the transit area on the free circulation line L2, it widens the transit area on the delivery line L3, and vice versa.

In particular, the directional valve SV1 comprises an actuator (not illustrated) that is movable between a first position and a second position. In particular, the first position is a rest position and the second position is a maximum stroke position of the actuator. The two positions are extreme and the actuator moves from the rest position to the maximum stroke position with a gradual movement. The actuator is typically known as a slider.

In the rest position, the transit area of the free circulation line L2 is completely open while the transit area of the delivery line L3 is completely closed.

In the maximum stroke position, the transit area of the free circulation line L2 is completely closed, while the transit area of the delivery line L3 is completely open.

The actuator is configured such that the movement from the first (rest position) to the second position (maximum stroke position) narrows a transit area of the free circulation line L2 and opens a transit area of the delivery line L3.

The movement from the second to the first position, on the other hand, opens the transit area of the free circulation line L2 and narrows the transit area of the delivery line L3.

In the preferred and illustrated embodiment, there are two directional valves SV1, SV2 that intercept in sequence the free circulation line L2 and the delivery line L3. The operation of the two directional valves SV1, SV2 is corresponding to each other.

Preferably, each directional valve SV1, SV2 is located in a corresponding operating section K1, K2.

The distributor 10 comprises a slide valve 1 arranged on the free circulation line L2, downstream of the directional valve SV1, SV2.

As is known, a slide or shuttle valve uses the straight sliding movement of a piston placed inside a seat, to open and close the connection paths. The slide slides longitudinally in the valve body while the fluid flows perpendicularly.

Therefore, the slide valve 1 is preferably of the normally closed type when the actuator is in the rest position and opens following a linear characteristic. This means that the flow rate and the pressure are related to each other in a linear proportional manner.

In particular, the slide valve 1 is driven into closure by a signal picked up from the free circulation line L2 downstream of the valve itself and into opening by a signal picked up from the free circulation line L2 upstream of the valve itself (and downstream of the directional valve SV1, SV2).

The distributor 10 comprises a valve device 2 configured to be activated when on the free circulation line L1 a threshold value is reached that is given by the difference between a pressure value upstream and a pressure value downstream of the directional valve SV1, SV2 and to maintain the pressure difference equal to the threshold value. The valve device 2 thus performs the function of pressure compensator and in combination with the directional valve SV1, SV2 it performs the function of flow rate regulator.

In other words, the valve device 2 remains deactivated if the pressure difference between upstream and downstream of the directional valve SV1, SV2 is lower than the threshold value. When the threshold value is reached, the valve device 2 is activated and operates to limit the pressure difference to the threshold value.

Figure 11:
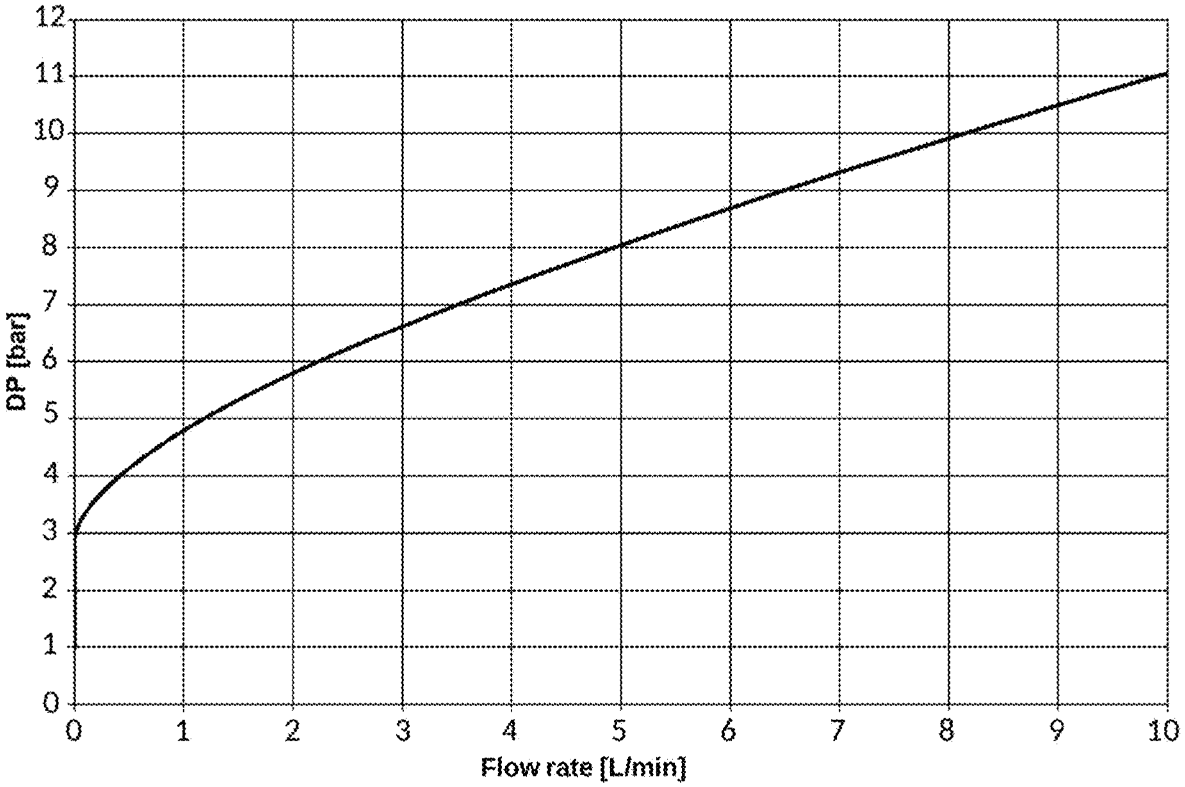
FIG. 11 illustrates an example of control characteristic of the slide valve.

The slide valve 1 and the valve device 2 are illustrated in their non-exclusive version with fixed calibration. Preferably, the threshold value of the valve device 2 is typically comprised between 8 and 10 bar. A typical characteristic of the slide valve 1 is as in FIG. 11. In particular, the slide valve 1 is configured to follow a linear opening/closing characteristic in an operating interval. In other words, the transit gap of the slide valve 1 (directly correlated to the amount of flow rate through the slide valve 1) increases/decreases linearly as the pressure difference between a pressure value upstream and a pressure value downstream of the directional valve SV1, SV2 varies.

The distributor 10 comprises a negative control line L4 which carries a pressure signal picked up from the free circulation line L2 in an intermediate position between the directional valve SV1, SV2 and the slide valve 1 to the pump P. The pressure signal of the negative control line L4 will be a driving pressure signal for the pump P, in a negative way.

If the pump P is a variable displacement pump, the negative control line L4 is a hydraulic line that originates from the free circulation line L2 and brings the fluid to the pump P.

If the pump P is a fixed displacement electric pump, the negative control line L4 is an imaginary line, as will be clearer below.

In accordance with a first embodiment, illustrated in FIGS. 2-6, the valve device 2 is arranged on the free circulation line L2. Preferably, the valve device 2 is arranged on the free circulation line L2 downstream of the directional valve SV1, SV2 and upstream of the slide valve 1. This allows both the valve device 2 and the slide valve 1 to be arranged in the closing cover PK, reducing the overall dimensions and facilitating the implementation of this solution in the existing hydraulic distributors.

In particular, the valve device 2 is driven into closure by a signal picked up from the delivery line L3 and into opening by a signal picked up from the free circulation line L2 upstream of the device itself.

In particular, the slide valve 1 is driven into opening by a signal picked up from the free circulation line L2 upstream of the valve itself and downstream of the valve device 2.

Preferably, the presence of a first choke O1 on the driving line to close the valve device 2 and of a second choke O2 on the driving line to open the slide valve 1 allows to manage any control instabilities of the devices in case of particularly pushed dynamics.

Alternatively, the valve device 2 is arranged on the free circulation line L2 upstream of the directional valve SV1, SV2.

Figure 7:
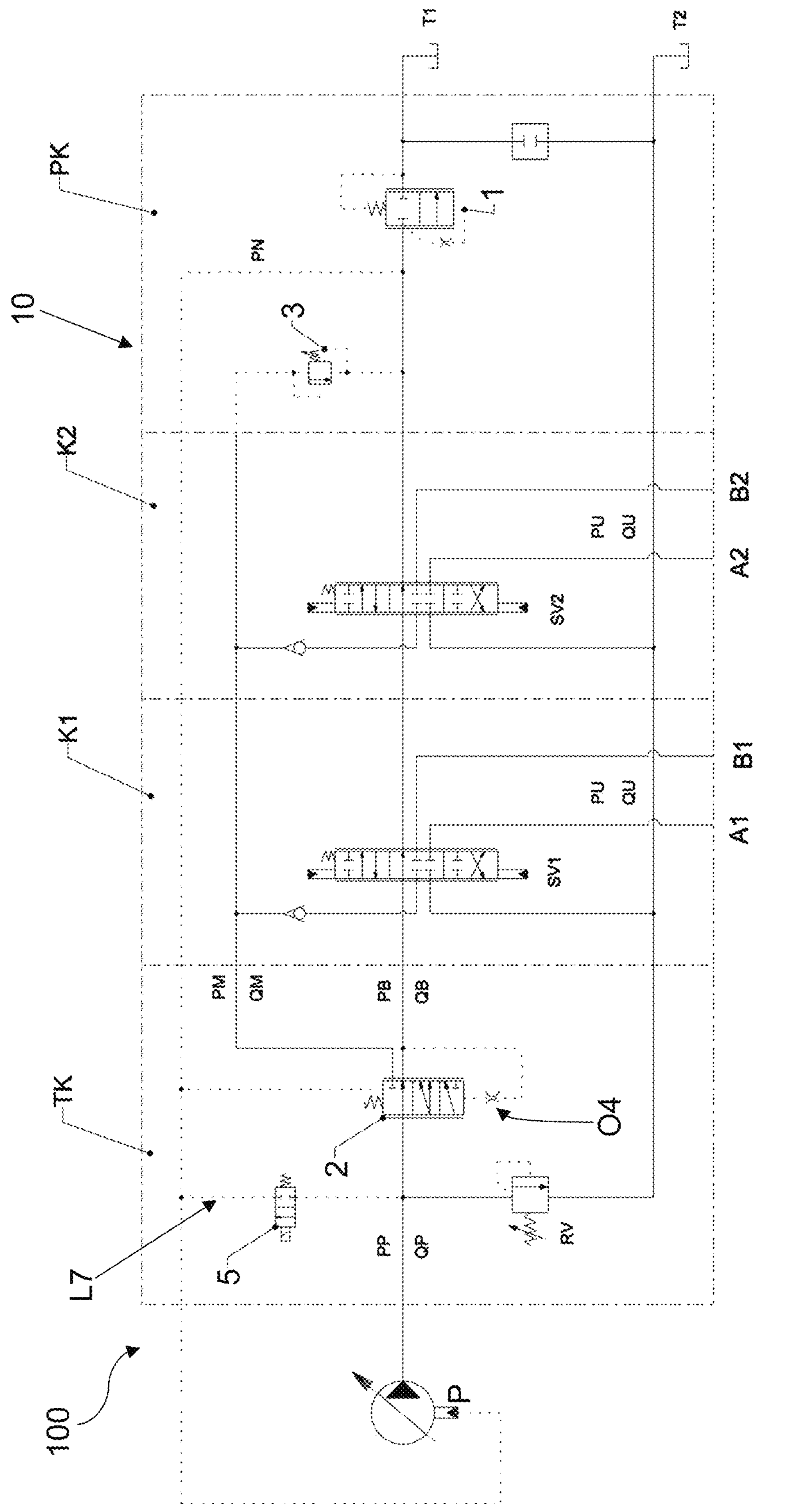
FIG. 7 illustrates a power transmission system for transmitting to users of an operating machine, comprising a second embodiment of an open centre hydraulic distributor, according to the present invention, in schematic circuit view.
Figure 8:
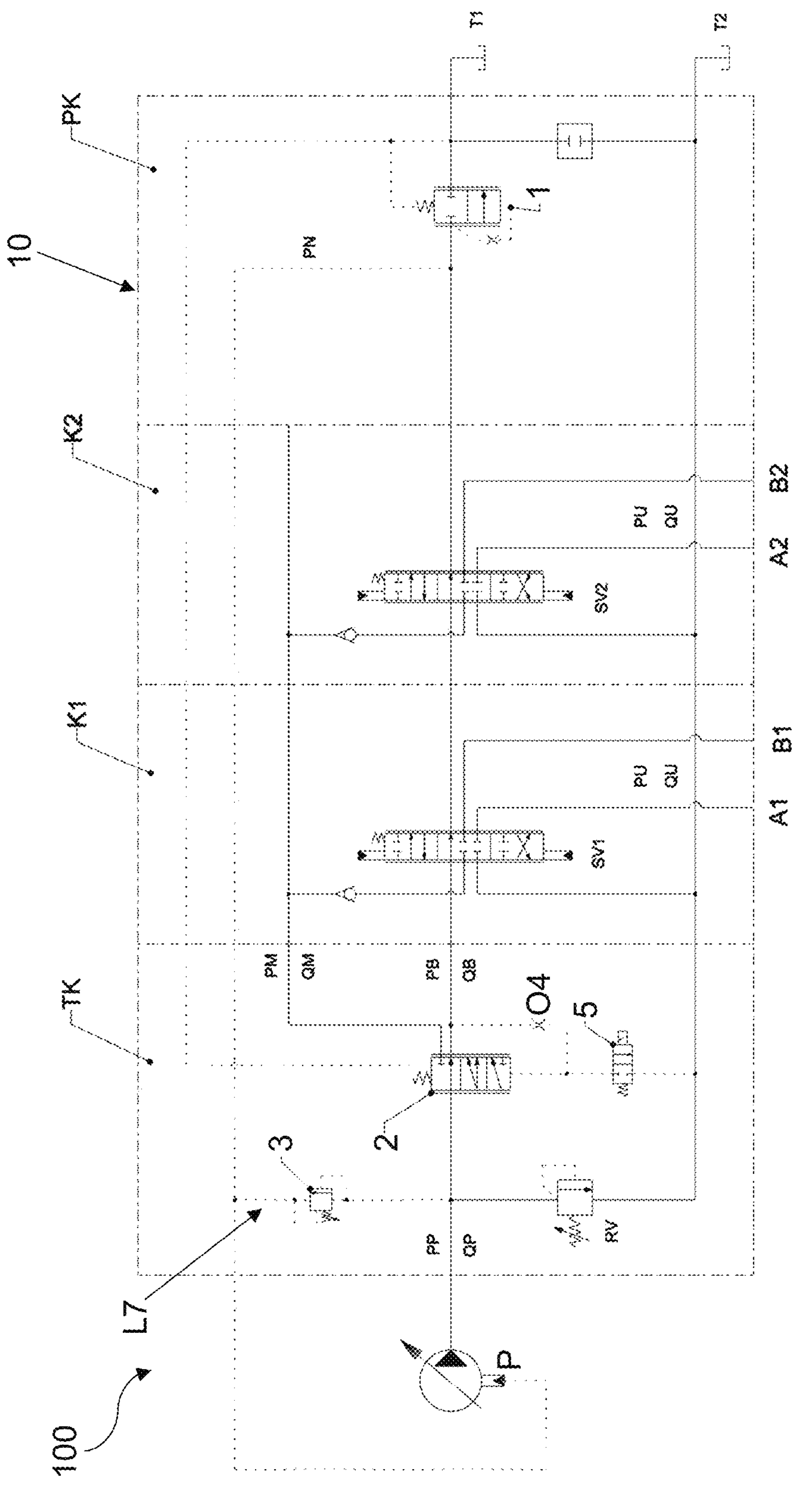
FIG. 8 illustrates the power transmission system of FIG. 7 with an alternative embodiment of the distributor, in schematic circuit view.

In accordance with a second embodiment, illustrated in FIGS. 7 and 8, the valve device 2 is arranged on the supply line L1. The valve device 2 can be configured in at least a first condition, in which it establishes an exclusive communication of the supply line L1 with the free circulation line L2, and a second condition, in which it puts the supply line L1 in communication with the free circulation line L2 and the delivery line L3.

In particular, the valve device 2 is configured in the first condition when on the free circulation line L2 the difference between a pressure value upstream and a pressure value downstream of the directional valve SV1, SV2 is lower than the threshold value. When the threshold value is reached, the valve device 2 is configured in the second condition.

Summing up, in this second embodiment the valve device 2 puts in exclusive communication the supply line L1 with the free circulation line L2 until on the free circulation line L2 the difference between a pressure value upstream and a pressure value downstream of the valve direction SV1, SV2 is lower than the threshold value. When the threshold value is reached, the valve device 2 is activated to maintain this pressure difference equal to the threshold value on the free circulation line L2, putting the supply line L1 also in communication with the delivery line L3 so as to divert an amount of excess flow rate.

In accordance with the embodiment of FIG. 7, the valve device 2 is driven into closure towards the first condition, in which it establishes an exclusive communication of the supply line L1 with the free circulation line L2, by the negative signal PN and into opening towards the second condition, in which the supply line L1 is put in communication with the free circulation line L2 and the delivery line L3, by a pressure signal picked up from the free circulation line downstream of the valve device 2.

In accordance with the embodiment of FIG. 8, the valve device 2 is driven into closure towards the first condition, in which it establishes an exclusive communication of the supply line L1 with the free circulation line L2, by a signal picked up from the discharge or drain line T1 and into opening towards the second condition, in which the supply line L1 is put in communication with the free circulation line and the delivery line L3, by a pressure signal picked up from the free circulation line downstream of the valve device 2.

Preferably, the presence of a choke O4 on the driving line to open (towards the second condition) the valve device 2 allows to manage any control instabilities of the devices in case of particularly pushed dynamics.

Preferably, in the second embodiment the valve device 2 is arranged in the inlet section TK.

The operation of the first embodiment of the distributor 10 connected to a variable displacement pump P is described below, in which the valve device 2 is interposed between the directional valve SV1, SV2 and the slide valve 1.

For explanatory purposes, reference will be made below to a plurality of pressures and flow rates in play in the distributor 10 during its operation.

In particular, the pressure PP will be the pressure of the supply line L1, i.e. of the pump P, and the corresponding flow rate will be indicated with QP.

The pressure PC will be the pressure downstream of the last directional valve SV1, SV2 and upstream of the valve device 2 and the corresponding flow rate will be indicated with QC.

The pressure PB will be the pressure on the free circulation line L2 upstream of the first directional valve SV1, SV2 and the corresponding flow rate will be indicated with QB.

The pressure PM will be the pressure on the delivery line L3 upstream of the first directional valve SV1, SV2 and the corresponding flow rate will be indicated with QM.

The pressure PU will be the pressure on the delivery line L3 downstream of the directional valve SV1, SV2, i.e. on the side of the users A1, B1, A2, B2, and the corresponding flow rate will be indicated with QU.

The pressure PN will be the pressure along the negative control line L4 and the corresponding flow rate will be the flow rate QN. This pressure and flow rate correspond to those on the free circulation line L2 between the valve device 2 and the slide valve 1.

At start-up, the pump P would tend to move to the maximum displacement and consequently the maximum flow rate dispensing.

In the present invention, the negative pressure signal PN follows the flow characteristic of the slide valve 1, which is of a linear type. The intervention of the slide valve 1 is very gradual and not very sensitive to the effects of the temperature on its control characteristic, being much more stable and precise than a control made by a choke, as in the known solutions. In such known solutions, as the flow rate on the free circulation line increases, the pressure upstream of the control choke increases according to the quadratic law until a pressure/negative equilibrium flow rate condition is reached as a function of the regulation characteristic of the pump itself.

Also in this case the negative pressure PN tends to increase until a pressure-flow rate equilibrium condition is reached in combination with the control curve of the pump regulator.

The flow rate flowing along the free circulation line L2 and through the directional valve SV1, SV2, in this equilibrium condition, generates a pressure drop along the line and de facto the negative control pressure PN, corresponding to a point of the control characteristic of the slide valve 1, is lower than the pressure PC upstream of the valve device 2 and than the pressures PB=PM upstream of the operating sections K1, K2 of the distributor 10.

Typically, the setting (i.e. the threshold value) of the valve device 2 is slightly higher than the pressure delta between pressure PB and pressure PC, measured in a rest condition. This avoids uncontrolled self-driving of the valve device 2 itself. In fact, if the pressure loss were higher than the setting of the valve device 2, the pressure PB=PM would be able to drive the valve device 2 itself into closure. The valve device 2 would narrow the transit thus increasing the pressure PC in order to rebalance the forces acting on the valve device 2 itself (spring and driving pressures). As PC grows automatically, with the same crossing flow rate and therefore pressure drop on the directional valve SV1, SV2, also the pressure PB would tend to increase, generating an uncontrolled loop until the maximum system pressure is reached.

Substantially, the valve device 2 compensates for the pressure differential between upstream and downstream of the directional valve SV1, SV2 so as to jointly form a multi-utility flow regulator.

The valve device 2 maintains the pressure drop constant through the directional valve SV1, SV2 and consequently the flow rate crossing the directional valve SV1, SV2 itself is a function of the transit areas (slider control notches) acting on the free circulation line L2 and partly of the characteristic of the slide valve 1 (in its correlation with the regulation characteristic of the pump from which the minimum system flow rate and the control thereof derive).

The functionality of the valve device 2 is completely independent of the slide valve 1 and is not influenced by its characteristic but only by the minimum flow rate value of the system at rest and by the control characteristic curve of the regulator of the pump P. The pressure difference PB−PC is not influenced by the characteristic of the slide valve 1 and therefore by the pressure PN. The directional valve SV1, SV2 is shaped in such a way as to saturate this pressure difference, during movement from the rest position to the maximum operating stroke, near the opening of the delivery area that connects the delivery line L3 with the users A1, B1, A2, B2.

Basically, assuming a movement of the directional valve SV1, SV2 from the rest position, the flow rate crossing the entire free circulation line L2, the valve device 2 and the slide valve 1 up to the discharge T1, undergoes a disturbance of its equilibrium condition due to the narrowing ("restriction") of the transit area due to the movement of the actuator towards the maximum stroke. The transit area tends to reduce itself causing an increase in the pressure loss on the directional valve SV1, SV2 itself. At this stage, the pressures PN and PC remain unchanged with respect to the rest condition while the pressure PB tends to increase due to the additional pressure drop. By moving the directional valve SV1, SV2 further, the additional pressure drop will increase until the calibration of the valve device 2 will be saturated, which will begin from this moment to enter into regulation so as to maintain the pressure difference astride the directional valve SV1, SV2 nominally constant and equal to its calibration. In practice, the compensator 2, in the face of a pressure drop on the directional valve SV1, SV2 will react by partializing the crossing area so as to increase the pressure PC downstream of the directional valve SV1, SV2, de facto restoring the nominal value of the regulation delta PB-PC equal to the calibration (threshold value) of the valve device 2.

Up to this operating condition the pressure PN remains unchanged at its initial reference value (stand-by condition–minimum displacement regulation). Continuing to reduce the transit area of the directional valve SV1, SV2 triggers the actual flow rate regulation on the free circulation line L2 in that, by maintaining a constant pressure difference across the directional valve SV1, SV2 by means of the valve device 2, the reduction of the transit area results in a corresponding reduction of the crossing flow rate along the line.

The system consisting of the directional valve SV1, SV2 and of the valve device 2 acts de facto as a flow regulator on the free circulation line L2 upstream of the slide valve 1, with the advantage of being more reactive than systems working with higher pressure differences. The further advantage of this solution is the independence of the flow regulator system from the back pressure characteristic of the slide valve 1, which contributes to the reduction of the control deadband of the operating functions (thus obtaining better control dynamics).

The moment in which the valve device 2 enters an active regulation phase, the directional valve SV1, SV2, suitably phased, opens the transit area that connects the delivery line L3 with the users A1, B1, A2, B2. At this point, if the pressure PM is lower than the pressure on the side of the users PU, there is no flow through the directional valve SV1, SV2 on the delivery line L3 and consequently all the flow rate dispensed by the pump continues to be managed by the free circulation line L2 (flow rate of the pump QP=flow rate in the free circulation line QB), activating a regulation loop of the valve device 2 that forces the system to an increase in the pressures PC and PB until a condition is reached in which the pressure PB exceeds the pressure of the users PU, allowing the flow rate to transit between delivery and users.

In this new operating condition, the flow rate QP dispensed by the pump P is equal to the sum of QM (flow rate on the delivery line L3) and QB (flow rate on the free circulation line L2). From this operating condition onwards, by continuing to move the directional valve SV1 to the end of the stroke, the flow rate QM will only be a function of the transit area and consequently of the stroke of the directional valve SV1, SV2, thus maintaining total independence from the load PU.

The flow rate QB is also only a function of the stroke of the directional valve SV1 and totally independent of the load to the utilities. If several utilities are actuated at the same time and the pressure PM is greater than the loads on the users, the previous observations still apply to the flow rate QM corresponding to the sum of the flow rates QU of the various operating functions actuated; that is, the sum of the flow rates to the users continues to be independent of the loads but not the single flow rate to the user that is affected by the value of the load itself in relation to the value of the loads of the other utilities. The flow rates QU are distributed as a function of the relative loads like in a normal open centre distributor. Assuming to maintain the position of the directional valve SV1, SV2 constant in a condition of active flow rate to the utility, if the load (pressure) PU suddenly varies the system automatically reacts to compensate for this variation. In particular, if the pressure PU increases and becomes greater than the pressure PM or PB then the flow rate to the users tends to go to zero. The flow rate dispensed by the pump P suddenly has as the only open transit area the free circulation line L2 which, however, being subject to the regulation of the valve device 2, does not allow this increase in flow rate and forces the system to operate in such a way as to increase the pressures PC and PB consistently with its calibration until the pressure value PU is exceeded by PM/PB. In this condition, the operating condition is restored and the flow rate to the utilities is restored as described above.

The flow rate QU is constant as the load PU varies in the case of a single actuation.

On the basis of these reasonings, it is possible to conform the transit gaps of the directional valve SV1, SV2 so as to control a maximum flow rate to the utilities that is lower than the maximum flow rate dispensable by the supply pump QP, unlike the classical open centre or standard negative control systems. The possibility of making the sum of the flow rates to the utilities independent of the load also allows the generation of automatic control laws of the functions, if it is associated with distributors with electric, electromechanical or electrohydraulic control, greatly expanding the possibilities of machine automatisms and making some operating functionalities much simpler for the inexperienced operator.

At the time of the multifunctional movement, it is clear, from the previous explanation, how the flow rate QM is distributed to the various utilities and its independence from the load.

At the same time, the movement of a further directional valve SV1, SV2 (for a total of two) introduces an additional choking on the free circulation line L2 which results, following the regulation of the valve device 2, in a reduction in flow rate QB and consequently in a reduction in pressure PN on the slide valve 1, in accordance with the linear characteristic thereof. The reduction of the control signal PN of the displacement of the pump P corresponds to an increase in the flow rate dispensed by the same which de facto increases the portion QM diverted to the utilities.

With the directional valve SV1, SV2 at the end of the stroke and the transit area on the free circulation line L2 completely closed, all the flow rate dispensed by the pump P is directed to the utilities (QP=QM, QB=0) completely cancelling the energy dissipation, intrinsic in the negative control system, due to the power balance along the free circulation line L2.

With reference to the second embodiment of the distributor 10, as already described in part above, the different positioning of the valve device 2 introduces some differences both of a constructive and functional nature with respect to the previous embodiment. Compared to the latter, the valve device 2 is able to manage an additional flow path selectively and makes the free circulation line L2 a priority in terms of operating flow rate and pressure compensated so as to never miss the regulation of the system by the directional valves SV1, SV2. The dimensioning of the additional flow line must take into account the corresponding ratio of the flow rates managed by the free circulation line L2 and by the additional line which de facto in the versions represented is nothing more than the delivery line L3. The valve device 2 in the second embodiment is positioned on the supply line L1 upstream of the directional valves SV1, SV2 and under rest conditions it connects the supply line L1 to the free circulation line L2 excluding the additional delivery line L3. The rest position is maintained stable by means of the force of a contrast spring (represented as pushing in the non-exclusive conformation thereof) and an operating pressure acting on the active area on the spring side, picked up on the free circulation line L2 downstream of the directional valves SV1, SV2. The rest position is altered by an operating pressure acting on the active area opposite the previously described contrast spring, picked up downstream of the valve device 2 on the free circulation line L2 upstream of the directional valves SV1, SV2. The rest position is maintained until the difference of the two pressures acting on the active areas of the valve device 2 exceeds a calibration value of the contrast spring. Upon exceeding this value and as a function of the flow rate controlled on the free circulation line by varying the flow areas of the directional valves SV1, SV2, the valve device 2 progressively moves into a new operating condition in which the supply line L1 is put in communication also with the delivery line L3.

In the attached figures, the valve device 2 of the second embodiment is represented in a non-exclusive conformation, also characterized by a third operating condition, in which the supply line L1 is exclusively connected to the delivery line L3. However, this condition is typical of dynamic transients with unstable position due to the conformation of the driving signal acting on the active area opposite the contrast spring (as per figure) and is not decisive for the control functionality of the valve device 2. The transition between the various operating conditions of the valve device 2 can be altered in its dynamics by means of the choke O4 acting on the previous driving signal. When the valve device 2 is in the second operating condition, it will act in such a way as to reduce the transit gap in the connection between the supply line L1 and the free circulation line L2 as the load to the users and consequently the pressure on the delivery line L3 increase. This action is the result of the intrinsic characteristic of pressure compensation integrated into the valve device 2, in such a way as to maintain the driving pressure delta of the device itself as constant as possible as a function of the characteristic of the abutment spring and of the hydrodynamic forces acting on the slide thereof.

At the same time, the opening of the connection between the supply line L1 and the delivery line L3 will be such that the crossing pressure losses are minimized in order to maximize the energy efficiency of the regulation system.

Figure 3:
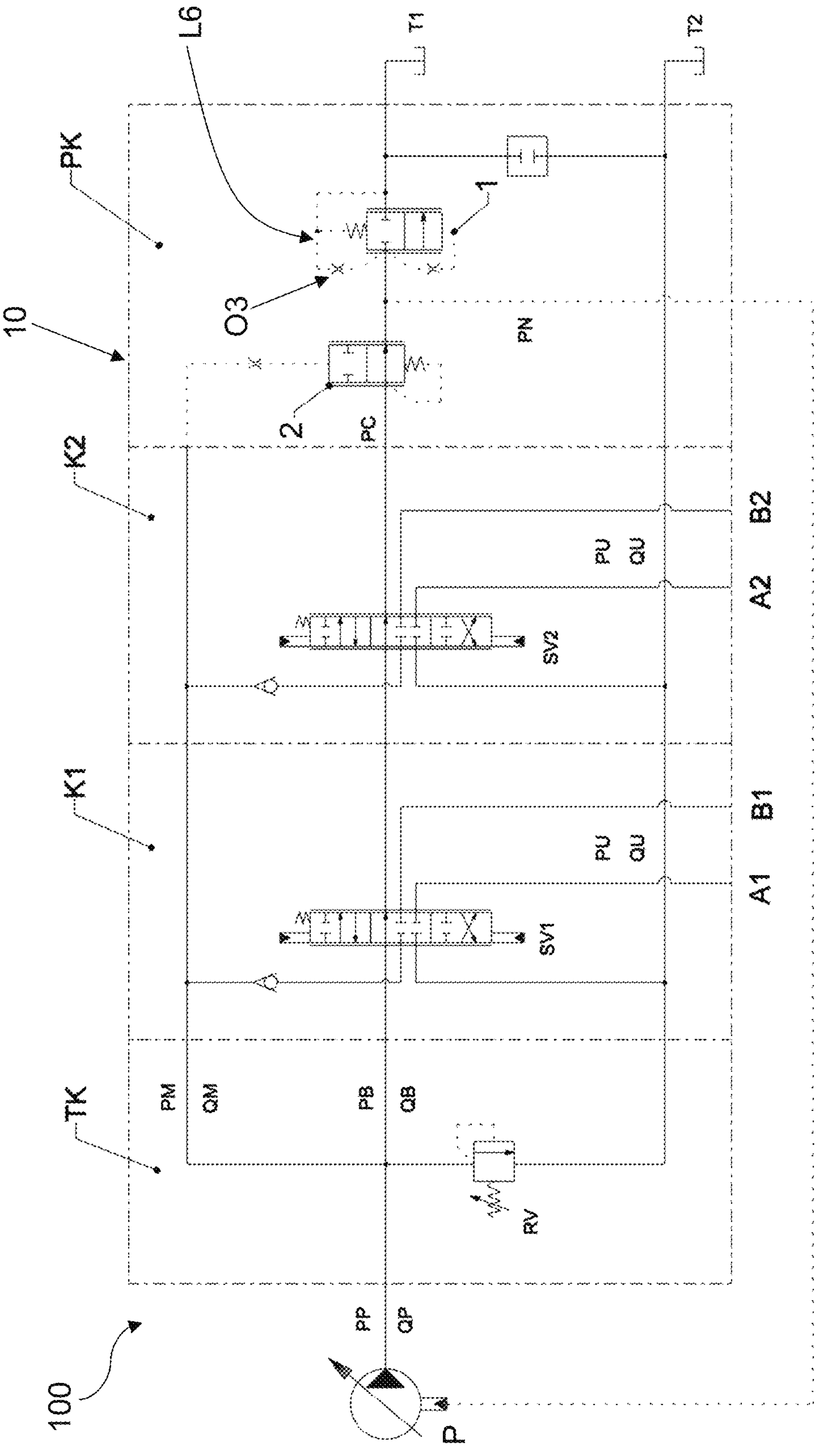
FIG. 3 illustrates the power transmission system of FIG. 2 in which a dynamic bypass is implemented on the slide valve, in schematic circuit view.
Figure 4:
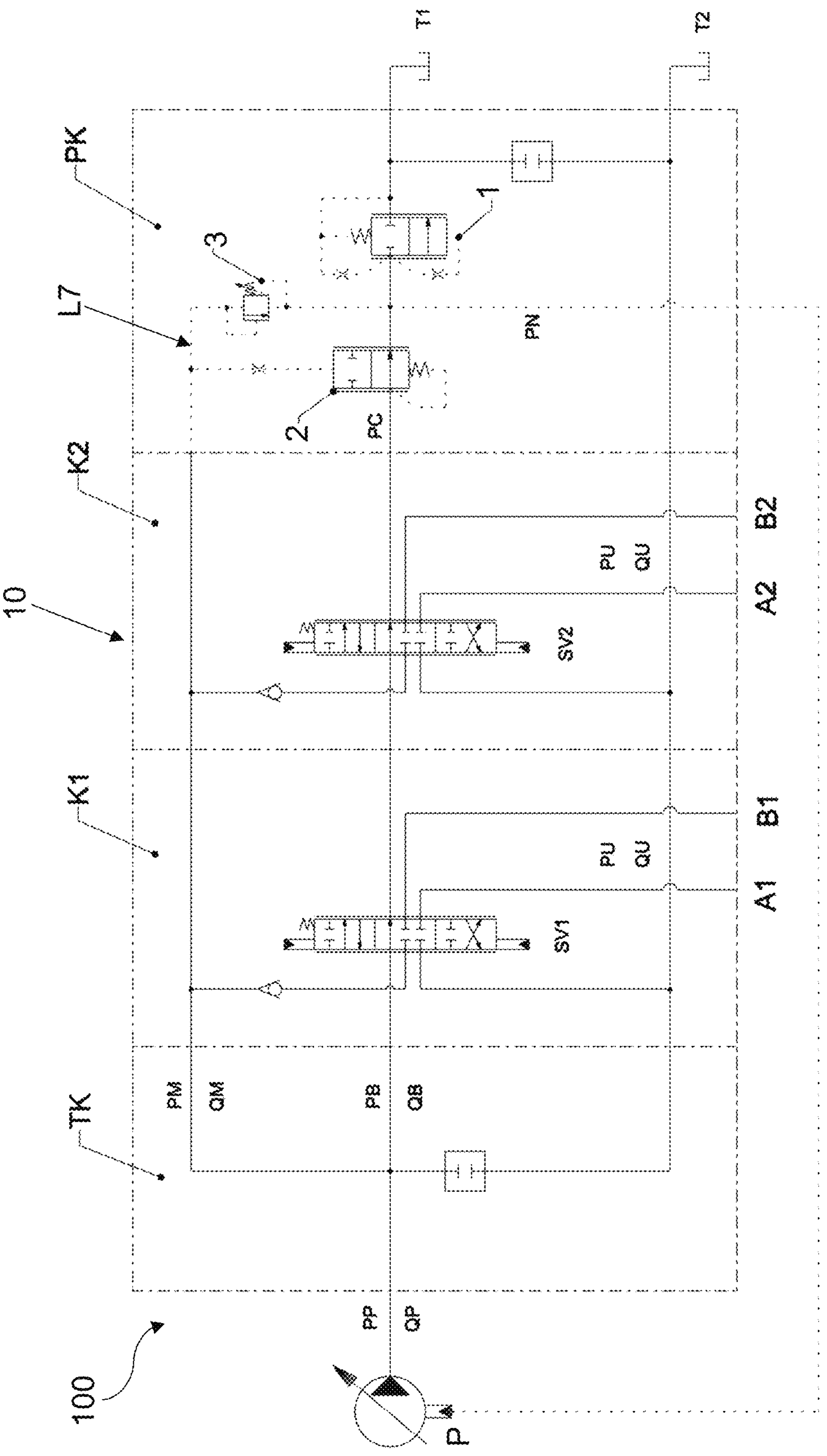
FIG. 4 illustrates the power transmission system of FIG. 3, in which the pressure relief valve is implemented, in schematic circuit view.

In accordance with an embodiment, illustrated in FIG. 3, the distributor 10 comprises a diverting line L5 that connects the supply line L1 to the discharge T2. A maximum pressure valve RV is arranged along the diverting line L5.

In case of end-of-stroke of the actuator, the system, being closed the transit area towards the actuator itself, moves into maximum operating pressure conditions diverting the excess flow rate along the diverting line L5 on which a maximum pressure valve RV is arranged. The valve RV limits the system pressure by discharging to the tank (discharge T2) the entire flow rate QP dispensed by the pump with high power dissipation.

In accordance with an embodiment, illustrated in FIG. 3, the distributor 10 comprises a bypass line L6 that puts in communication a portion of the free circulation line L2 upstream of the slide valve 1 with a portion of free circulation line L2 downstream thereof.

In the simplest but not exclusive embodiment thereof, the bypass line L6 comprises a calibrated hole (choke O3), which may or may not be integral with the shuttle of the slide valve 1.

This device, by de facto altering the response dynamics of the slide valve 1, acts as a damping filter of the hydraulic oscillations which are typically at high frequency and the cause of potential regulation instabilities of the control system. The regulation system is de facto less influenced by the rapid hydraulic and mechanical dynamics of the machine, making the control thereof more stable, safer and easier.

In accordance with an embodiment, illustrated in FIGS. 4-8, the distributor 10 comprises a branch L7 connected on one side to the delivery line L3 or alternatively to the supply line L1 and on the other side to the free circulation line L2 in an intermediate position between the directional valve SV1, SV2 and the slide valve 1. In the first embodiment of the distributor 10, the branch L7 is connected to the free circulation line L2 in an intermediate position between the valve device 2 and the slide valve 1.

In one embodiment, the distributor 10 comprises a pressure relief valve 3 on the branch L7. When the maximum system pressure is reached, the pressure relief valve 3, by completely bypassing the regulation of the valve device 2, opens and discharges a driving flow rate directly onto the slide valve 1. In these conditions, which corresponded in the description reported above to a minimum/zero value of the signal PN and consequent maximum flow rate dispensed by the pump, the driving flow rate reactivates the control of the slide valve 1 with consequent increase in the pressure value PN until an equilibrium condition is reached, in which the minimum flow rate being discharged corresponds to the maximum system pressure. The maximum system pressure limitation thus configured corresponds to a minimum energy dissipation condition that is unusual for the classical and negative control open centre distributors and contributes significantly to system energy savings.

In particular, the pressure limitation thus made also allows a certain economic saving since the pressure relief valve 3, having to manage only a driving signal, is much smaller in size than the general valve RV and therefore less expensive and with smaller overall dimensions.

Figure 5:
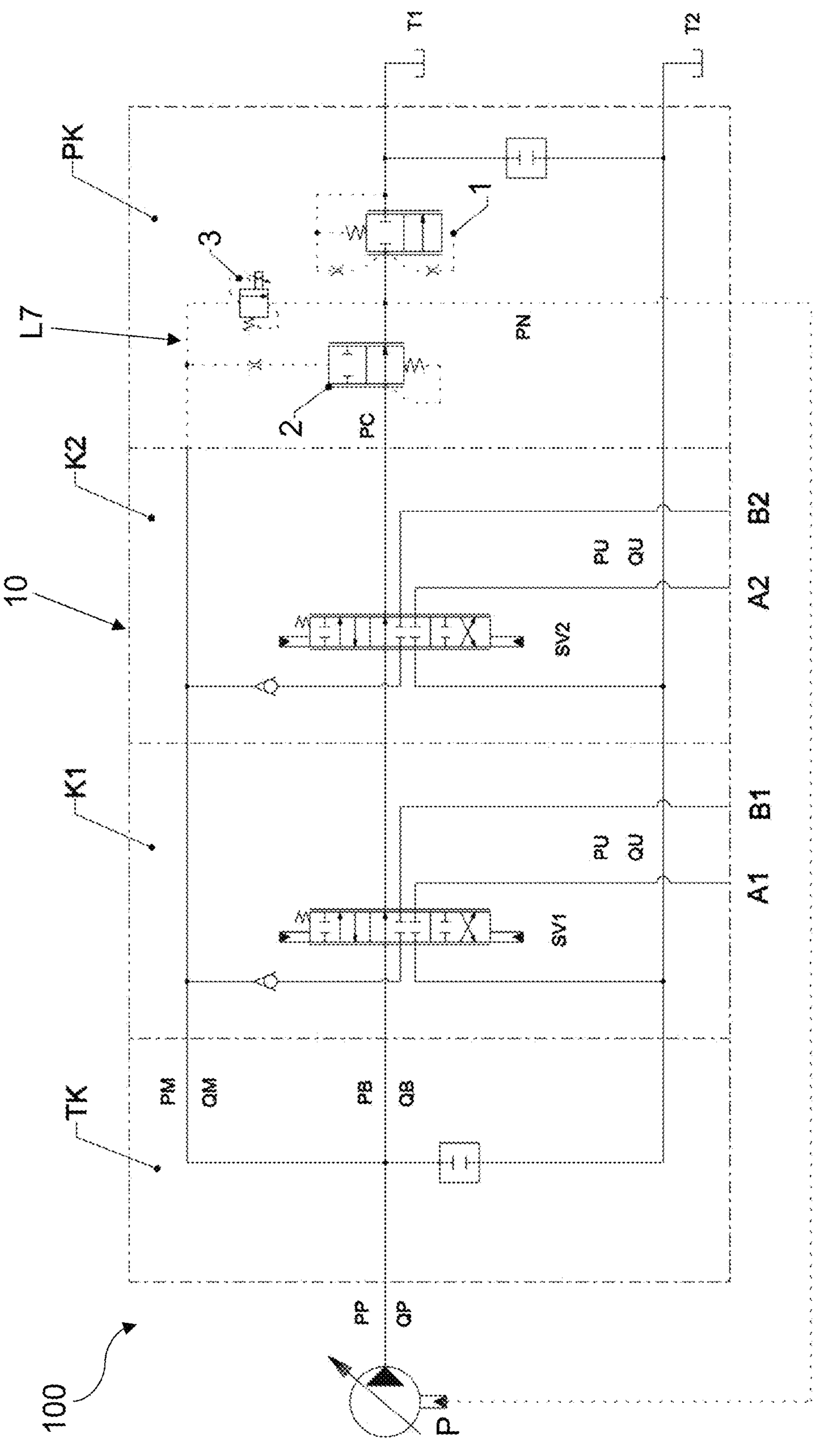
FIG. 5 illustrates the power transmission system of FIG. 4, with the proportional variant of the pressure relief valve, in schematic circuit view.

In the alternative embodiment illustrated in FIG. 5, the pressure relief valve 3 is of the proportional type. This allows further power control strategies to be implemented, in particular with electrical, electrohydraulic or electromechanical actuations, by varying the useful power as a function of the real operating conditions and of any smart auxiliary signals.

Figure 6:
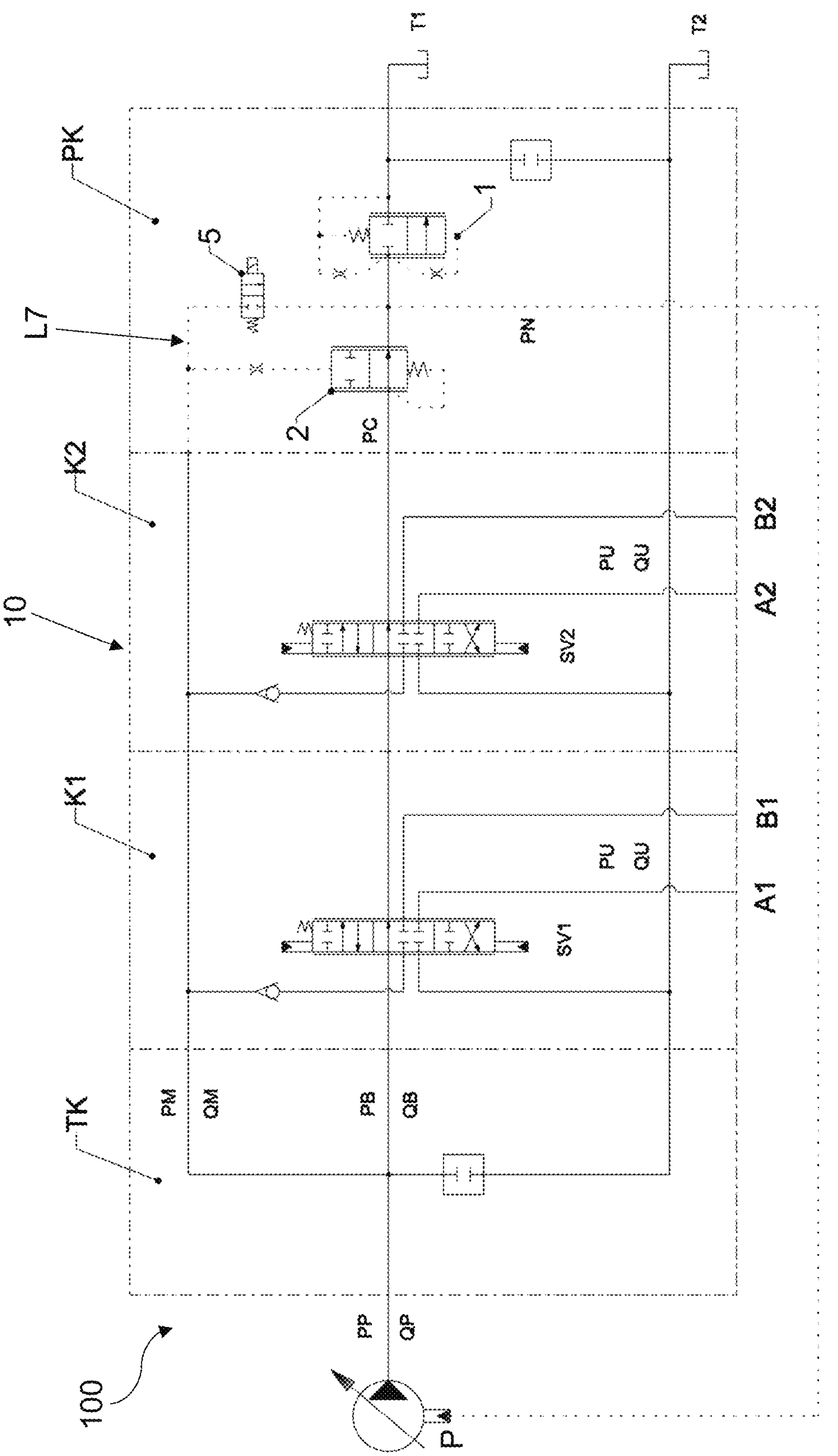
FIG. 6 illustrates the power transmission system of FIG. 3, in which a discharging solenoid valve is implemented, in schematic circuit view.

In a further embodiment illustrated in FIGS. 6 and 8, the distributor 10 comprises a solenoid valve 5 in place of the pressure relief valve 3. The solenoid valve 5 is configured to open in response to a signal. In particular, the solenoid valve 5 allows, based on its normally open or closed conformation, to command the system to stand-by in response to a received signal (for example, a digital command given).

The solenoid valve is for example of the on-off 2-way 2-position type.

Other embodiments can be deduced from the series or parallel connection of the previous embodiments.

In a further embodiment illustrated in FIG. 7, the solenoid valve 5 acts on the driving of the valve device 2 of the second embodiment so as to force the maintenance of the rest position, by discharging the pressure acting on the active area opposite to the spring side (as per figure, non-exclusive configuration) picked up from the free circulation channel L2, and to inhibit the connection between the supply line L1 and the delivery line L3 and keeping only the connection with the free circulation line L2 open.

The distributor 10 and the pump P define a power transmission system 100 for users A1, B1, A2, B2 of an operating machine, according to the present invention.

As already mentioned, the pump P is of the negative control type, i.e. the negative control line L4 carries the pressure signal PN thereto. The pump P is arranged upstream of the distributor 10. In particular, it communicates with the distributor 10 through the supply line L1.

In accordance with the embodiment illustrated in FIGS. 2-8, the pump P is a variable displacement pump.

A summary version of the operation of the power transmission system defined by distributor 10 and pump P with negative control and in the version with variable displacement follows.

At start-up, the system immediately moves into a condition of equilibrium between negative pressure PN and supply flow rate of the pump QP=QN based on the control characteristic of the slide valve 1 and of a device actuating the change of displacement of the pump P.

The moment in which an operating function (i.e. a user A1, B1, A2, B2) is actuated, on the one hand the connection of the delivery line L3 is opened and at the same time that of the free circulation line L2 is closed.

Initially, the sequence provides for a reduction in the transit on the free circulation line L2 without the simultaneous opening of the delivery gaps L3, which results in an increase in the pressure PB without modification of the flow rate crossing the free circulation line L2, which remains equal to the minimum flow rate of the system in stand-by with flow rates QP, QB and QN nominally equal to each other and with zero flow rate QM. This equilibrium situation also remains with directional valve SV1, SV2 open on the delivery of the users and therefore with open connection between delivery channel and users, until the pressure PB=PM=PP by increasing due to the continuous reduction of the transit area on the free circulation line L2 exceeds the pressure PU on the side of the users allowing the utility to move. In this condition, part of the flow rate, which initially only flowed from the pump P towards and through the free circulation line L2, is diverted towards the utilities or users A1, B1, A2, B2. The reduction in flow rate on the free circulation line L2 causes the immediate drop in the negative pressure PN with the consequent reaction of the negative control of the pump P which will try to restore the equilibrium of the control by increasing the displacement of the pump P and consequently the supply flow rate. This increase in flow rate will be partly diverted to the utilities/users and partly diverted to the free circulation line L2 until a new system equilibrium point is reached. If, after this new system equilibrium has been reached, the load to the utilities tended to increase, a new imbalance factor would intervene in such a way as to partially or totally divert the flow rate from the utilities to the free circulation line. The excess flow rate with respect to the previous equilibrium condition would cause the increase in the negative pressure PN and consequently the reduction in the supply flow rate of the pump P until a new equilibrium point is reached.

Figure 9:
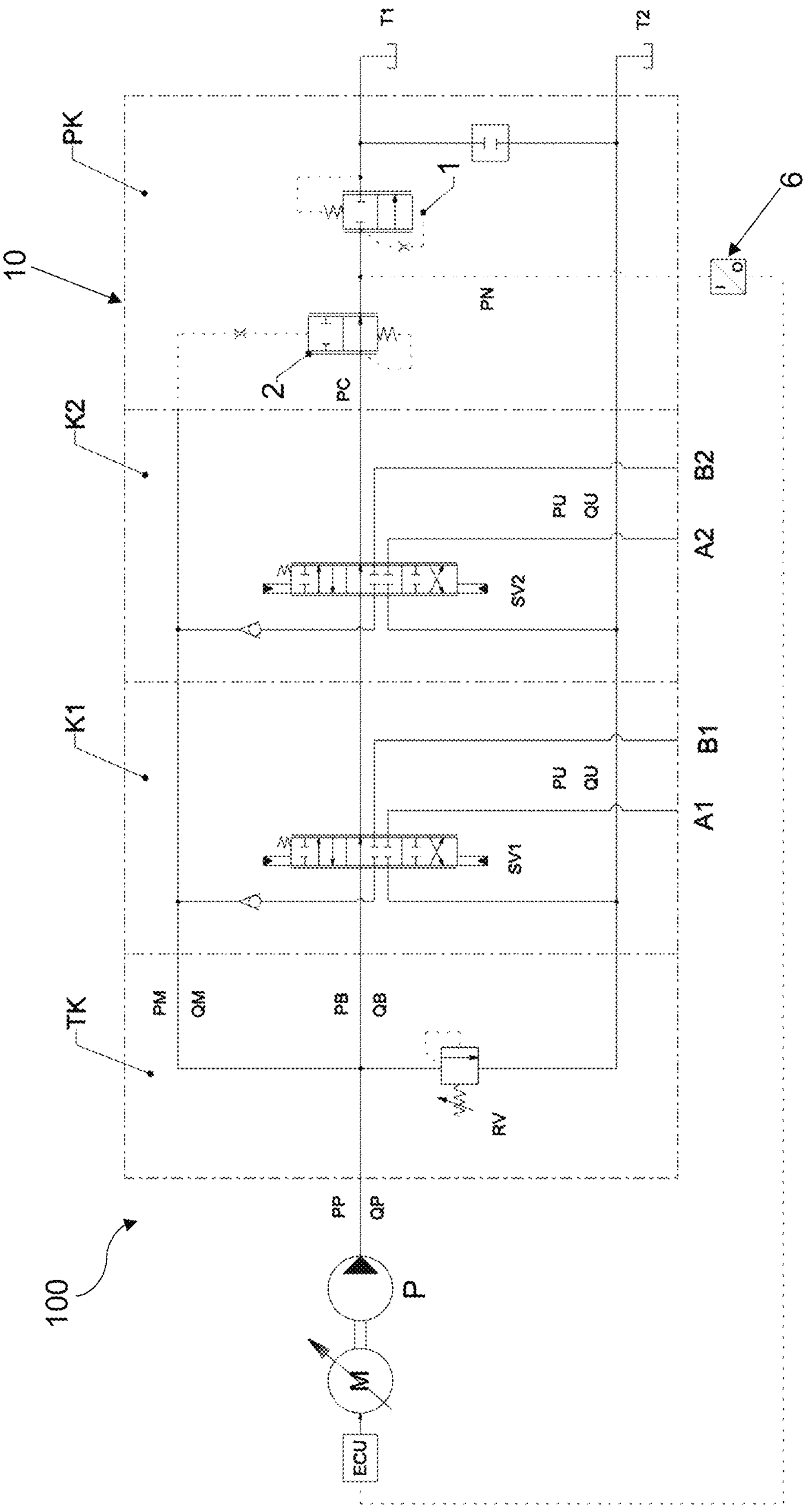
FIG. 9 illustrates an embodiment of a power transmission system for transmitting to users of an operating machine, with a fixed displacement electric pump, comprising a first embodiment of an open centre hydraulic distributor, according to the present invention, in schematic circuit view.
Figure 10:
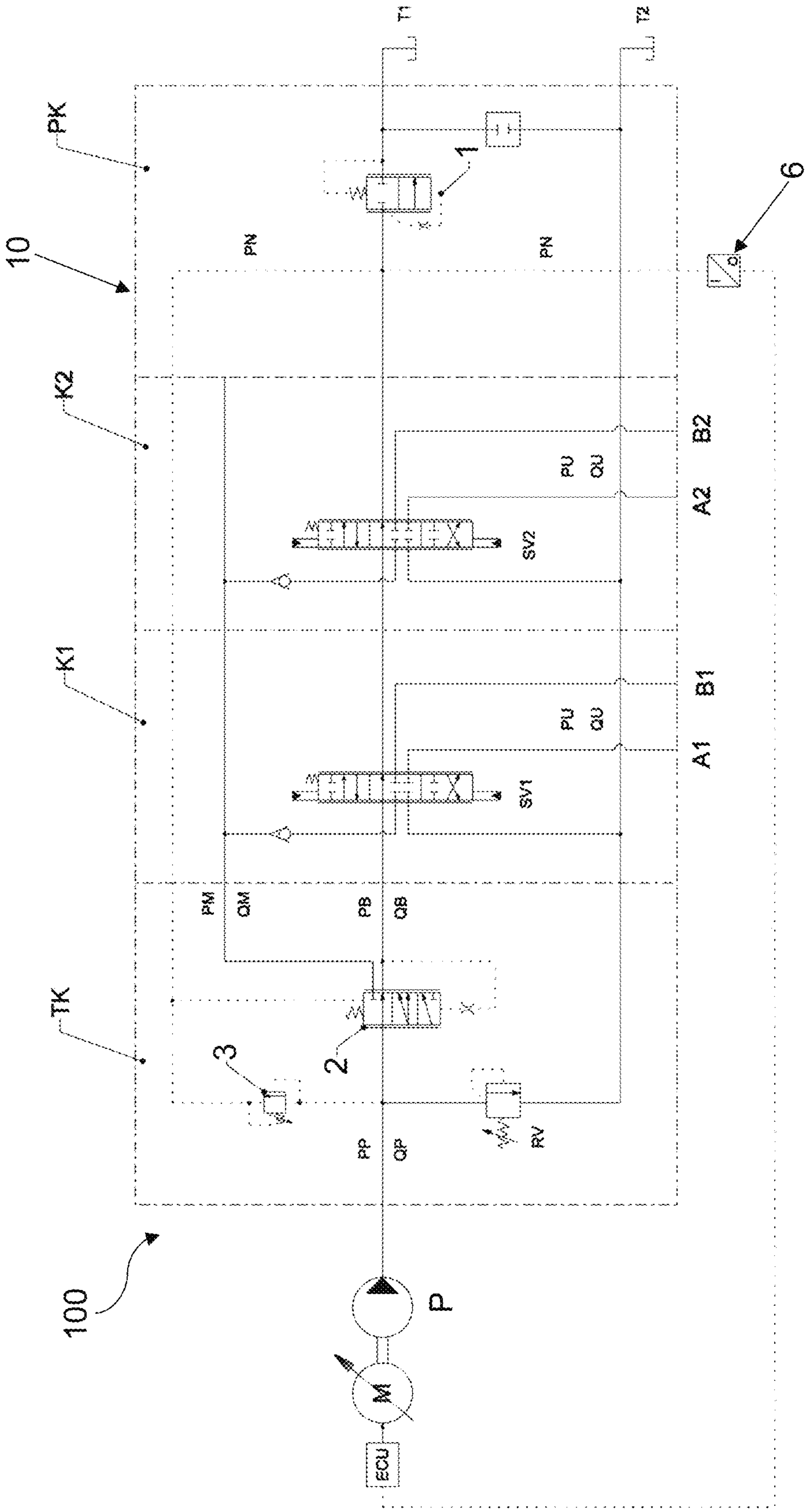
FIG. 10 illustrates an embodiment of a power transmission system for transmitting to users of an operating machine, with a fixed displacement electric pump, comprising a second embodiment of an open centre hydraulic distributor, according to the present invention, in schematic circuit view.

In accordance with an alternative embodiment, illustrated in FIGS. 9-10, the pump P is a fixed displacement electric pump. In particular, FIG. 9 reports the application of the fixed displacement electric pump P to the distributor 10 in the first embodiment thereof. FIG. 10, on the other hand, reports the application of the fixed displacement electric pump P to the distributor 10 in the second embodiment thereof, in the version with pressure relief valve 3.

Given the growing interest of the market in the electrification of machines with the implementation of solutions aimed at saving system energy, the aforementioned figures show some architectural solutions based on the above-described embodiments in combination with appropriate sensors, programmable devices (ECUs-electronic control units), electric motors with relative control/actuation devices (inverters) and fixed displacement pumps. In the basic configuration, the power transmission system 100 comprises at least one pressure sensor 6 that is operationally active so as to detect a pressure value upstream of the slide valve 1. This value is suitably converted into an output signal suitable for being processed by an electronic control unit ECU. The control logic of the ECU, following the processing of the input signals, will provide the target signal to the inverter responsible for managing the electric motor M and consequently the fixed displacement pump P interconnected thereto.

As reported above, in this embodiment the negative control line L4 is not a hydraulic line, but an imaginary line by means of which the pressure sensor 6 brings the pressure value PN detected upstream of the slide valve 1 to the electric pump P.

From the description made, the characteristics of the open centre hydraulic distributor and of the power transmission system for transmitting to users of an operating machine, according to the present invention, are clear, as are the advantages.

In particular, the presence of the slide valve entails that the control signal PN follows the flow characteristic of the valve, which is of a linear type. The intervention of the negative valve is very gradual and not very sensitive to the effects of temperature on its control characteristic, being much more stable and precise than the control made by a choke. In the known solutions with a choke, as the flow rate on the free circulation channel increases, the pressure upstream of the control choke increases according to the quadratic law.

In addition, the use of a slide valve in place of the prior art choke results in reduced noise of the distributor. This is particularly advantageous for applications with electric pumps, in which low (or no) noise is a distinctive feature.

In addition, the fact that the functionality of the compensator is completely independent of the slide valve and is not influenced by its characteristic allows to obtain a better (in the sense of more precise) flow rate control functionality on the free circulation channel, effectively eliminating from the flow rate regulation system the variable parameter given by the characteristic of the slide valve. In this way a direct correlation is obtained between settings of the valve device and opening gaps of the directional valves (and consequently with the operating stroke of the directional valves) without the further variable given by the pressure variation in relation to the flow characteristic of the slide valve. In addition to a more precise control, the independence of the regulation from the characteristic of the slide valve makes the control more progressive and stable, while the absence thereof can result in a more aggressive system control with potential instabilities and oscillatory dynamics that are difficult to dampen.

In addition, the embodiment with the pressure relief valve arranged on a branch between the delivery or supply line (depending on the configuration and embodiment) and the free circulation line involves minimal energy dissipation and contributes significantly to system energy savings.

In addition, the proportional version of the pressure relief valve finds particular utility in applications involving electronics. In fact, the need to overcome the criticalities linked to battery life paves the way to new ideas for pressure limitation with low energy consumption in case of intervention of the pressure relief valve, to variations in the architecture of the hydraulic circuit that allow to reduce the minimum flow rate during stand-by without affecting the reactivity of other circuits, such as for example the hydroguide, to new solutions to handle the typical working parameters of the negative control systems to limit the pressure peaks during regulation.

In addition, the embodiment with the discharging electric valve, in the various configurations described, allows the system to be brought into a condition of functional inhibition with low energy impact, reducing dissipations to the mere power required to sustain the stand-by condition.

Finally, the use of a fixed displacement pump, driven by an electric motor appropriately commanded in relation to a pressure signal, represents one of the most energy-efficient, simple, intuitive and economical solutions from a construction point of view. The operating flexibility is innate in the electronic management of the variation in rotation speed of the electric motor as a function of the signal coming from the sensors integrated into the system. Compared to the conventional systems, the electronic management of a system thus configured does not require any mechanical component for the control of hydraulic power but the fluid power demand can be easily varied by acting on the revolutions of the electric motor. The electrical decoupling does not require additional hydraulic lines for the transmission of the signal to the power unit. The possibility of easily commanding a fixed displacement hydraulic pump that in the most widespread and economical version thereof is configured with external gears (e.g. helical), allows to obtain better results in terms of operating noise than the similar piston fixed or electronically controlled variable displacement versions.

That which is claimed:

1. An open center hydraulic distributor of a fluid, comprising:

- a supply line for supplying said fluid that is receivable from a pump of the negative control type;
- a free circulation line that connects the supply line to at least one discharge;
- a delivery line that connects the supply line to one or more users downstream of the distributor;
- at least one directional valve so fitted as to intercept the free circulation line and the delivery line, said at least one directional valve comprising an actuator that is movable between at least a first and a second position and so configured that the movement from the first to the second position narrows a transit area of the free circulation line and opens a transit area of the delivery line;
- a slide valve arranged on the free circulation line downstream of said at least one directional valve, wherein said slide valve is configured to follow a linear opening/closing characteristic in an operating interval;
- a valve device configured to be activated when on the free circulation line a threshold value is reached that is given by the difference between a pressure value upstream and a pressure value downstream of said at least one directional valve, and to maintain said pressure difference equal to the threshold value;
- a negative control line to pick up a pressure signal from the free circulation line in a position downstream of said at least one directional valve and upstream of the slide valve, said negative control line being intended to bring a pressure signal to the pump to perform the control of negative type.

2. The distributor according to claim 1, wherein the valve device is arranged on the free circulation line.

3. The distributor according to claim 1, wherein the valve device is arranged on the supply line and is configurable in at least one first condition, in which it establishes an exclusive communication of the supply line with the free circulation line, and a second condition, in which it places the supply line in communication with the free circulation line and the delivery line.

4. The distributor according to claim 3, wherein the valve device is configured in the first condition when the difference between a pressure value upstream and a pressure value downstream of said at least one directional valve is lower than said threshold value; when the threshold value is reached the valve device is configured in the second condition.

5. The distributor according to claim 1, comprising a bypass line that puts in communication a portion of free circulation line upstream of the slide valve with a portion of free circulation line downstream of the slide valve, and a choke arranged on the bypass line.

6. The distributor according to claim 1, comprising:

- a diverting line that connects the supply line to the discharge;
- a maximum pressure valve arranged along said diverting line and configured to open when a set pressure value that is equal to a maximum system pressure value is reached.

7. The distributor according to claim 1, comprising:

- a branch connected on one side to the delivery line or alternatively to the supply line and on the other side to the free circulation line in an intermediate position between said at least one directional valve and the slide valve;
- a pressure relief valve arranged on the branch and configured to open when a set pressure value is reached that is equal to a maximum system pressure value.

8. The distributor according to claim 1, comprising:

- a branch connected on one side to the delivery line or alternatively to the supply line and on the other side to the free circulation line in an intermediate position between said at least one directional valve and the slide valve;
- a solenoid valve arranged on the branch and configured to open in response to a signal.

9. A power transmission system for transmitting to users of an operating machine, comprising:

- a distributor according to claim 1;

a pump of the negative control type, said pump being arranged upstream of the distributor, said distributor receiving a fluid from the pump by the supply line.

10. The power transmission system according to claim 9, wherein the pump is a fixed displacement electric pump, said power transmission system comprising at least one pressure sensor that is operationally active on the free circulation line to detect a pressure value upstream of the slide valve, said pressure sensor being in communication with the electric pump.

* * * * *